Oct. 9, 1945. O. C. IRWIN Re. 22,678

REFRIGERATING SYSTEM

Original Filed Sept. 12 1932 3 Sheets-Sheet 1

Oct. 9, 1945. O. C. IRWIN Re. 22,678

REFRIGERATING SYSTEM

Original Filed Sept. 12 1932 3 Sheets-Sheet 2

INVENTOR.
Oliver C. Irwin
BY H. Theodore Simmons
his ATTORNEY

Oct. 9, 1945. O. C. IRWIN Re. 22,678

REFRIGERATING SYSTEM

Original Filed Sept. 12 1932 3 Sheets-Sheet 3

INVENTOR
Oliver C. Irwin
BY W. Thurston Simmons
his ATTORNEY

Reissued Oct. 9, 1945

Re. 22,678

UNITED STATES PATENT OFFICE 22,678

REFRIGERATING SYSTEM

Oliver C. Irwin, deceased, late of New York, N. Y., by Standard Cap & Seal Corporation, assignee, New York, N. Y., a corporation of Virginia Original No. 2,316,791, dated April 20, 1943, Serial No. 632,740, September 12, 1932. Application for reissue April 19, 1944, Serial No. 531,846

11 Claims. (Cl. 62—2)

The invention relates to refrigeration systems and more particularly to a system of mobile refrigeration. Insofar as this application is concerned, the invention will be described in conjunction with refrigerated railway cars particularly, but it will be apparatus that certain phases of the invention will be applicable to refrigerated motor trucks and other units of mobile transportation.

Heretofore, railway cars have been cooled by the time honored ice and salt method or by the use of evaporating chemicals or by the use of mechanical refrigeration machines wherein the motor, compressors, condenser, evaporator, etc., are all carried by the car.

These former systems have many disadvantages such as the matter of weight, unreliability in emergencies, unreliability of mechanically moving parts, etc., and etc.

It is one object of the invention to provide a system of refrigeration for mobile units wherein there are no moving parts on the unit.

It is another object of the invention to provide such a system wherein the weight of apparatus and refrigerant becomes a negligible factor in the total weight of the mobile unit; and likewise wherein the useful load carrying space occupied by the refrigerating equipment is also a negligible part of the total useful space of the unit.

The foregoing objects of the invention are in part accomplished by the particular system and improvements hereinafter disclosed and in part by the particular apparatus used on the mobile unit. As to the refrigerating system used, it is basically an absorption system. However, the absorption system in the case is divided into a plurality of units.

It is a further object of the invention to provide an absorption system wherein the total refrigeration cycle is performed in separate places.

It is a still further object of the invention to provide a system of mobile refrigeration using the absorption cycle wherein a portion only of the cycle is performed on each mobile unit.

It is an even further object of the invention to provide a system of mobile refrigeration wherein a portion of an absorption cycle of refrigeration is performed on each mobile unit and a plurality of such units cooperate with a central depot wherein the remainder of the absorption cycle of refrigeration is performed.

It is an even further object of the invention to provide a system of mobile refrigeration wherein the refrigerant used on the mobile unit is precooled.

It is still another object of the invention to to provide a system of refrigeration using the absorption cycle wherein the absorber is used to pre-cool the condensed refrigerant.

It is still another object of the invention to provide a system of mobile refrigeration wherein extensive use is made of finned surfaces on the mobile unit.

It is still another object of the invention to provide a system wherein the control of the temperature of the mobile unit is governed by the pressure in the refrigerant supply tank.

It is an even further object of the invention to provide a cooling arrangement for mobile units using an absorption system of cooling and an air circulatory system.

Other and further objects of the invention will be apparent from the following description taken in conjunction with the accompanying drawings, wherein—

Figure 1:
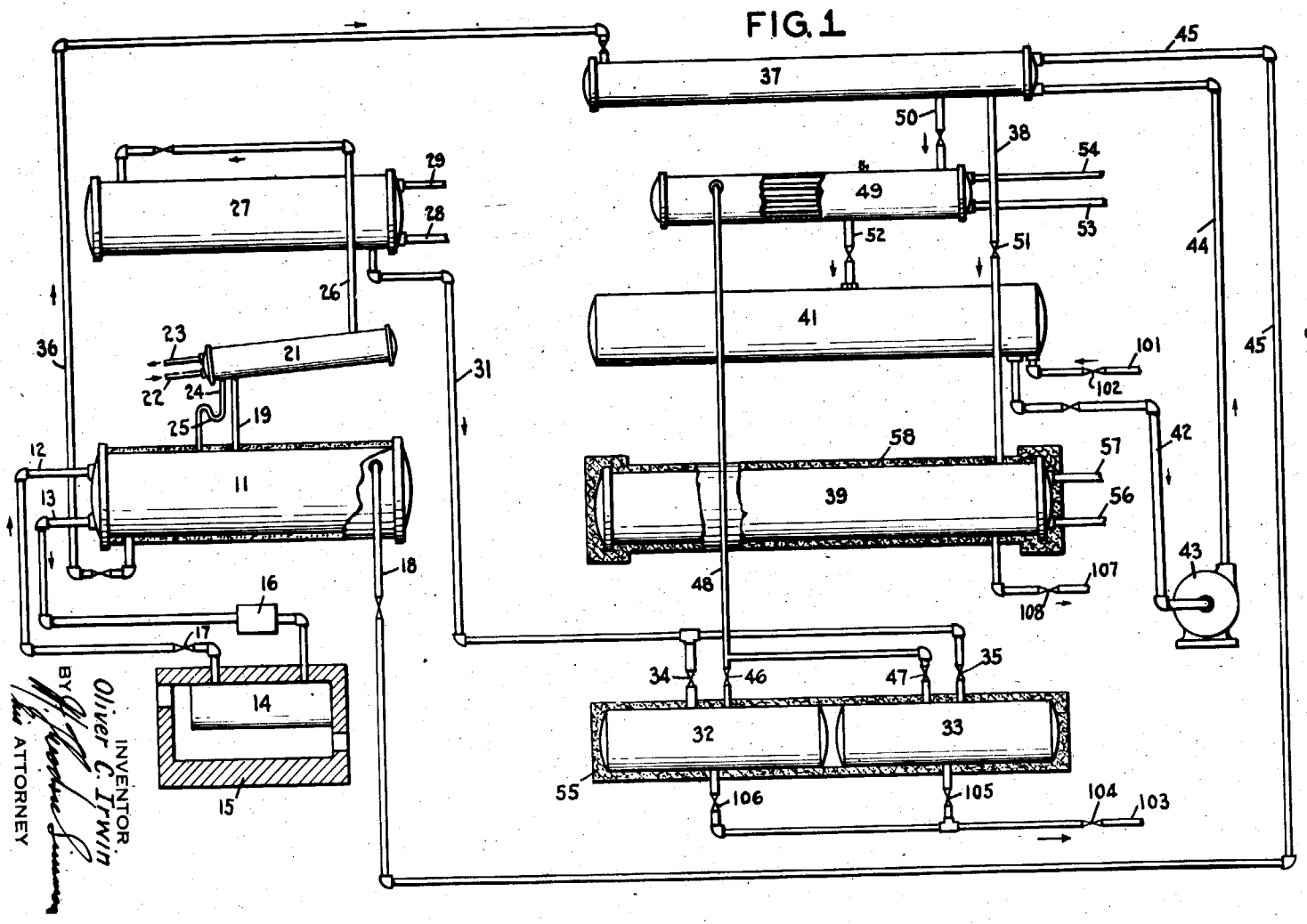
Figure 1 is a diagrammatic layout of so much of a refrigerating system and apparatus as is located at the central depot.

In absorption type refrigeration machines, the cycle of the process of producing cold may be stated as follows: There is introduced into a generator or still a liquid which is a combination of a refrigerant and an element which absorbs the refrigerant-respectively ammonia and water usually. Heat is applied to the generator sufficient to boil off the refrigerant which passes into a condenser in the form of a vapor. The condensed refrigerant in turn passes to an expander or evaporator. Here the refrigerant is again vaporized and absorbs the heat from the air or other medium surrounding the evaporator. The refrigerant leaves the evaporator and is returned to the generator, but interposed between the evaporator and generator is an absorber. The absorber contains the so-called weak liquor (the residue from the generator after the refrigerant is boiled off) and into the absorber is also introduced the refrigerant coming from the evaporator. The two unite and thus the liquor leaving the absorber for the generator is a strong liquor, by which is meant a liquor containing a strong charge of refrigerant or ammonia.

Of course, there may be various other elements introduced into this simple system such as a heat exchanger and a pump for getting the liquid from the absorber into the still, etc.

One step of the invention contemplates placing on the mobile unit only so much of the apparatus of an absorption system as is necessary to do the work of cooling the mobile unit, and leaving for a separate, detached and probably stationary central unit all that apparatus having to do with the reclamation and regeneration of the refrigerant. As it is shown and described in the instant application, the system contemplates having each railway car equipped with an evaporator fed from a storage tank of refrigerant, the vaporized or expanded refrigerant being collected in a second storage tank. This is all of the mechanism that is needed for actual cooling of the railway car because it is the vaporizing or expanding of the refrigerant which accomplishes the act of cooling. At centralized points along the railway system will be depots at which will be located the reclamation portion of the absorption system, namely, the generator, condenser, absorber and related elements. When a railway car is to begin its run from one of these central depots, anhydrous ammonia is introduced into one storage tank and weak liquor is introduced into the other storage tank in between which is the evaporator. Only so much charge is introduced as has been predetermined to be sufficient for the particular intended run plus whatever amount is determined upon as a safety factor.

At the end of the run there will be located another of these central depots. When the railway car reaches that point detachable hose connections will be made to the respective storage tanks on the railway car and the contents thereof pumped out and into appropriate storage tanks at the central depot. The car can then be refilled and sent on its way immediately. At the central depot the charge received from the railway car is passed into the generator where the refrigerant is boiled off, passed into a dehydrator, and into a condenser, the anhydrous ammonia passing directly into storage tanks. The weak liquor goes from the generator to the heat exchanger and from the heat exchanger into a weak liquor storage tank. Please note that certain details of the system are not referred to in this general description but will be brought out hereinafter.

Another step of the invention apart from the refrigerating system itself is the refrigerant itself is precooled to a very low temperature before being introduced into the railway car. The weak liquor may or may not be pre-cooled. One primary advantage of this pre-cooling is that there is introduced into the railway car or mobile unit only so much refrigerant as is necessary for the actual cooling of the car and none of the refrigerant will be used up in lowering the temperature of the refrigerant itself, as will be explained more fully hereinafter. It is at once apparent that anything that reduces the amount of refrigerant that has to be carried upon the railway car is advantageous both from the standpoint of space occupied and weight carried.

Referring to Fig. 1 of the drawings, which shows in outline so much of the absorption refrigeration system as is intended to be located at the central depot, a generator is indicated at 11. The source of heat in the generator is a coil of pipe not shown but having the ends thereof respectively connected to the inlet pipe 12 and the outlet pipe 13 that are in turn connected to the boiler 14 of a steam heating plant 15. 16 indicates a steam trap and 17 a shut-off valve, all of which construction and arrangement is usual and well known.

The strong liquor to be regenerated is supplied to the generator 11 from the pipe 18 in a manner hereinafter described. The heat in the steam coil in the generator 11 is sufficient to boil off the ammonia, the refrigerant referred to by way of example, and the ammonia vapor thus produced leaves the generator through the pipe 19, entering the dehydrator 21. The purpose of the dehydrator is to remove any water vapors that may pass from the generator through the pipe 19. Any form of dehydrator may be used and for purposes of illustration a dehydrator has been shown that condenses the water vapors and returns them to the generator. The dehydrator 21 is water cooled, the water circulating coils (not shown) in the dehydrator being connected to the inlet and outlet pipes 22 and 23 respectively that are in turn connected to a source of water supply. The water that is condensed in the dehydrator is returned to the generator through the return line 24 which contains a trap 25 to prevent the escape of vapors from the generator through the condensed water, the dehydrator being tipped at an angle as shown.

The ammonia vapors leave the dehydrator through the pipe 26 and enter the condenser 27. The condenser is also water cooled, the coils in the condenser being suppplied with a circulating cooling water through the inlet and outlet pipes 28 and 29. In the condenser, the ammonia vapors are completely condensed and leave the condenser through the pipe 31 entering one or the other of a pair of storage tanks 32, 33, depending upon the condition of the valves 34 and 35 respectively.

Returning to the generator 11, after the ammonia has been boiled off the strong liquor and the ammonia vapors have passed on, that which remains is what is known as a weak liquor. The weak liquor is water containing a small percentage of ammonia. The weakest liquor is of course at the bottom of the container 11 and this is removed from the generator through the pipe 36 which communicates with a heat exchanger 37. The heat exchanger 37 is of the well known tubular construction, the weak liquor being introduced into the shell and circulating through the exchanger about the tubes. The heat exchanger function will be described in the following paragraph. The partially cooled weak liquor leaves the shell of the heat exchanger 37 through the pipe 38 and enters the weak liquor storage tank and cooler 39.

The strong liquor to be regenerated (received from the trucks) is stored in the tank 41 and when it is to be regenerated is withdrawn from the tank 41 through the pipe 42 by means of the pump 43 which introduces this strong liquor into the tubular portion of the heat exchanger 37 through the pipe 44. The reason for this is that it is desirable from the standpoint of economy of operation to have the strong liquor as hot as possible when it is introduced into the container 11 and by circulating the strong liquor through the heat exchanger in contact with the hot weak liquor that comes from the generator it is heated and the weak liquor is cooled on its way to its storage tank and cooler. The strong liquor leaves the heat exchanger through the pipe 45 which communicates with the inlet pipe 18 leading into the generator 11.

Recapitulating, the complete cycle involves the circulation of the strong liquor from the storage tank 41 through the pump 43 and the heat exchanger 37 to the generator 11 where the ammonia is boiled off, the ammonia vapor passing throuhg the dehydrator 21 into the condenser 27 and the anhydrous ammonia passing from the condenser 27 to one or the other of the storage tanks 32, 33. The weak liquor leaves the generator 11, circulates through the heat exchanger 37 and is stored in its storage tank 39.

The regeneration or reclamation of the refrigerant is now completed and the refrigerant in the storage tanks 32 and 33 and the weak liquor in the storage tank 39 are now ready for use in doing the work of cooling but, as explained above, this portion of the refrigerating cycle is accomplished on the railway car or moble unit as will be hereinafter described.

The use of precooled materials on the railway car has heretofore been referred to. By precooling the refrigerant is meant lowering the temperature thereof by the amount necessary to bring the temperature of the refrigerant itself down to or below the temperature at which it is desired to maintain the unit to be cooled. This is sometimes referred to as the heat of the liquid which indicates the heat that it is necessary to take from one pound of liquid refrigerant in order to lower it from the temperature at which it is fed to the expansion valve to the temperature at which it boils in the evaporator. For example, if it is desired to start with a pound of liquid ammonia at 75° F., and heat is to be taken therefrom at −25° F., then the body of ammonia must first be cooled to that point.

By precooling the liquid in the central refrigerating plant, to the −25° F. point or below, and feeding that pre-cooled refrigerant to the railway car, it is at once apparent that only so much liquid refrigerant need be placed upon the railway car as is necessary to do the work of bringing the temperature of the railway car down to −25°, and maintain the railway car at this point over the predetermined period. Thus, the railway car is not called upon to provide either the space for nor carry the load of that amount of ammonia used to lower the temperature of the body of refrigerant down to the point of useful work, namely −25° F.

In the improved system shown in Fig. 1, the ammonia is precooled in first one and then the other of the storage tanks 32 and 33. It will be assumed that the ammonia in tank 32 is being precooled in which event the valve 46 will be opened and the valve 47 closed. Ammonia gas or vapor will be taken from the tank 32 through the pipe 48 to the absorber 49. Weak liquor is also introduced into the absorber 49 from the heat exchanger 37 through the pipe 50, it being necessary to adjust the valves 51 in pipe 38 and the valve in pipe 50 to divide the path of the weak liquor as desired. The ammonia gas or vapor entering from the pipe 48 meets the incoming weak liquor and becomes absorbed thereby, creating a strong liquor which passes from the absorber 49 through the pipe 52 into the strong liquor storage tank 41. The heat of the absorption is removed by circulating water through tubes or coils in the absorber, the tubes or coils being connected to the inlet and outlet pipes 53 and 54 respectively of the water circulating system.

This operation is continued until the ammonia remaining in the tank 32 is cooled to whatever temperature is desired, say −50° F. At that time the valve 46 will be closed and the valve 47 will be opened, whereupon the same operation will be repeated to pre-cool the ammonia in the tank 33. Of course, the valves 34 and 35 will be adjusted accordingly. It will be noted that the storage tanks 32 and 33 are enclosed by a thick casing of insulation 55.

Normally, in prior art systems, the absorber is located between the evaporator and the still or generator. The weak liquor from the still passes into the absorber from one side and from the other side there is introduced the ammonia returning from the evaporator or cooling element which ammonia is absorbed in the weak liquor converting it to a strong liquor. The strong liquor is then returned to the still where the ammonia is boiled off and the cycle is repeated as heretofore described.

There also may be introduced between the still and the absorber a heat exchanger which receives the hot weak liquor directly from the still, the weak liquor that goes to the absorber being in that case taken from the heat exchanger, while circulating through the interior of the heat exchanger is the strong liquor coming from the absorber, which being brought into heat exchanging relation with the hot liquor from the still raises the temperature of the strong liquor prior to its being introduced into the generator or still thereby reducing the work of the generator.

It will be apparent from the foregoing description that the heat exchanger 37 is functioning as in the normal absorption cycle but that the function of the absorber 49 is different in the proposed cycle. However, other means may be used to pre-cool the ammonia or refrigerant. For example, reference is made to the copending application, Ser. No. 632,741, filed concurrently herewith.

In the proposed system precooling the weak liquor which is also supplied to the railway car is contemplated. For this purpose the weak liquor storage tank 39 is provided with a water cooling system, the inlet and outlet pipes of which are indicated at 56 and 57 respectively. Also, the weak liquor storage tank is entirely enclosed by heat insulation indicated at 58.

The foregoing completes the equipment to be located at the central depot. Of course, it is entirely conceivable that this depot would be a small plant that would regenerate the charge from one railway car at a time and discharge the reclaimed refrigerant into the same or the next car which would make unnecessary the storage tanks referred to above.

Figure 2:
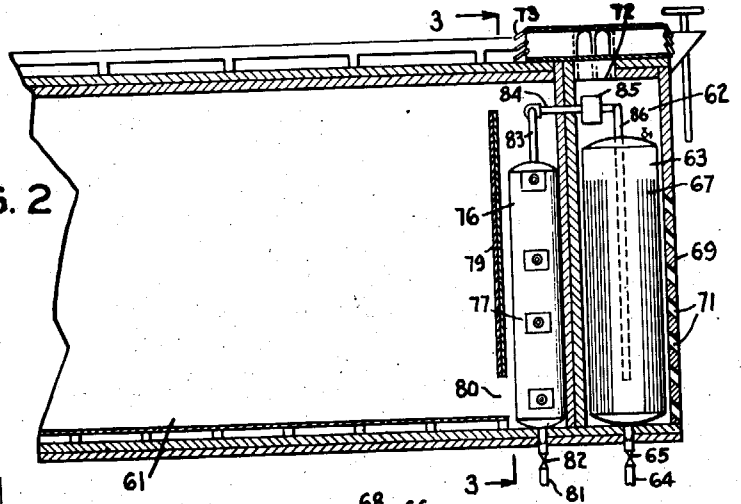
Fig. 2 is a diagrammatic illustration of the body portion of a railway car, parts being broken away and parts being shown in section to facilitate the illustration of the application of the invention thereto.
Figure 4:
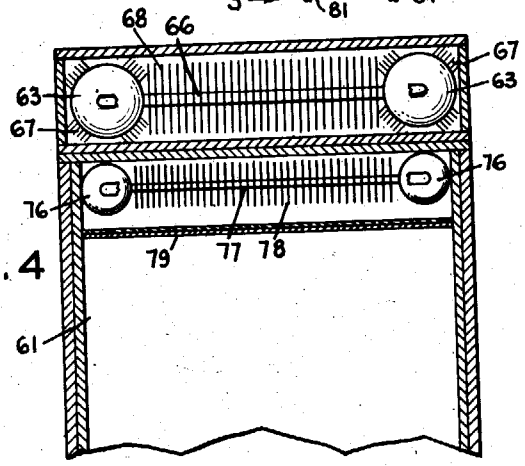
Fig. 4 is a partial top plan view of refrigerating mechanism taken with the top of the car body removed.
Figure 3:
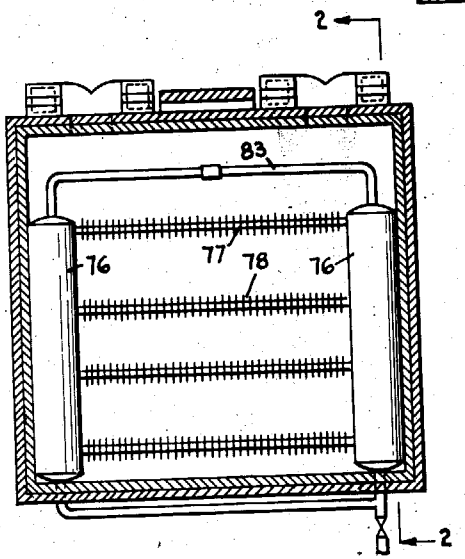
Fig. 3 is a vertical section on the line 3—3 of Fig. 2.

The description will now proceed to the equipment for the railway car. Referring to Figs. 2, 3 and 4, the body of a railway car is diagrammatically indicated at 61, as having a separate compartment 62, at either or both ends of the railway car 61. The compartment 62 contains a pair of tanks 63 which are intended to be filled at the central depot with weak liquor through the connection 64 that is controlled by the shut-off valve 65. The tanks 63 are interconnected by a plurality of cross pipes 66. It will be noted that tanks 63 are provided with finned surfaces indicated at 67 and that the connecting pipes 66 are provided with finned surfaces 68 which assist in the air cooling of the tanks and connecting pipes. Whether the compartment 62 is a closed-off space on the inside of the body of the car or a separate compartment outside of the body of the car as indicated at 62 is immaterial. For the purposes of securing air circulation the end wall 69 is provided with louvres 71 through which the air passes into the compartment 62. Outlets or ventilators for the air are indicated at 72, each having a forward and rear opening covered by pivoted leaves or flaps 73 that close under the pressure of the air from the direction of travel but are free to open in the opposite or rear direction to allow the escape of air from the compartment 62.

Mounted on the interior of the car are a pair of tanks 76 of smaller capacity than the tanks 63, the tanks being vertically disposed in the respective corners of the car so as to occupy the least amount of useful load carrying space and being adapted to contain the refrigerant used.

A number of different arrangements may be provided for cooling the interior of the car. One such arrangement is shown in Figs. 2, 3 and 4 wherein the tanks 76 are interconnected by means of a series of horizontally extending pipes 77 that are provided with finned cooling surfaces 78. The tanks 76 are contained in a separate compartment formed by the vertically disposed bunker wall 79 having one or more openings 80 at the bottom thereof and being open at the top. Without for the moment defining the connections between the tanks and the cooling coils, it will be apparent that air will circulate through the openings 80 into the compartment containing the tanks 76 and associated pipes, upwardly thereover, and thence out into the car.

The tanks 76 are intended to be filled at the central depot with pre-cooled refrigerant through the connection 81 controlled by the valve 82.

Figure 5:
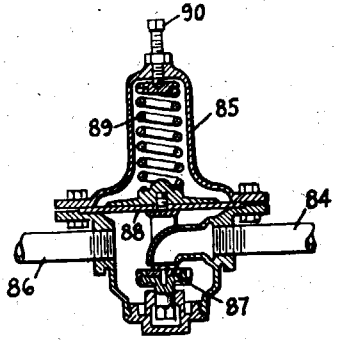
Fig. 5 is a vertical section of an automatic control valve.

Regulation of the temperature of the car is controlled in a unique manner. The refrigerant tanks 76 are interconnected by means of the pipe 83, which communicates with a pipe 84, a valve 85, and the pipe connection 86. The valve may be of any ordinary construction suitable for the purpose. One such valve is illustrated in detail in Fig. 5 wherein the valve is closed by the disk 87 carried by plunger 88 against which spring 89 presses, the tension of the spring being adjustable by means of the screw 90.

The temperature maintained in the car is directly proportional to the pressure existing in the tanks 76 and cooling pipes 77. It will be assumed that a fifteen pound pressure will maintain a zero temperature in the car and that this is the desired temperature. The cooling apparatus will continue to function and heat be extracted from the air circulating over the cooling surfaces 77, 78. When the pressure in the cooling system exceeds fifteen pounds, the valve disk 87 will be forced downwardly permitting the accumulated vapor and gas in the cooling system to escape through the pipe 86 into the absorber system of tanks 63 and pipes 66. When the pressure has been lowered to fifteen pounds, the valve disk closes under the action of the spring and thus the temperature of the car is maintained at a fixed level.

The functioning of the apparatus on the railway car may be described as follows: With the tanks 63 and 76 filled respectively with pre-cooled weak liquor and pre-cooled refrigerant, the refrigerant begins to boil off of the body in the tanks 76 and through the cooling coils in accordance with the requirements to reach and maintain the desired temperature in the car. The spent gas leaves the cooling coils and escapes into the weak liquor or absorber tanks 63 where it is absorbed and retained until the liquor is drawn off at the central depot.

In other words, the only portions of the absorption cycle that are accomplished on the railway car are expansion or evaporation and absorption—only what is necessary in the step of cooling. All of the other steps of the refrigerating cycle are performed at some other point. The resultant advantages in the operation of a plurality of refrigerated railway cars are obvious.

When the railway car reaches the central depot the flexible hose 101 is connected to the outlet connection 64 of the tanks 63, any well-known form of leak-proof connecting nozzle being used for this purpose. There may or may not be a pump inserted in this line, depending upon the relative heights of the railway car and central plant or of the relative pressures between the tanks 63 on the railway car and the tank 41 in the central depot. It may be explained at this point that during the course of the run of the railway car what was weak liquor in the tanks 63 at the beginning of the run has now become strong liquor by reason of the absorption of the spent gases from the cooling coils. This now strong liquor is transferred to the storage tank 41 after the valves 65 and 102 are opened.

At the same time the flexible hose 103 is connected to the outlet connection 81 on the tanks 76, the same manner of connection being effected. Also a pump may or may not be included in this connection line. Then upon opening the valves 82 and 104 and one or the other of the valves 105 and 106 the unspent charge of liquid ammonia or refrigerant, if any, in the tanks 76 is drawn off the railway car and stored in one or the other of the storage tanks 32, 33.

The railway car is then ready to be re-filled so as to continue its run. This is done by detaching the hose connection 101 from the outlet connection 64 and attaching thereto the flexible hose connection 107 leading from the weak liquor storage tank 39. This connection line may or may not include a pump. Upon opening the valve 108 the tanks 63 are filled with pre-cooled weak liquor from the storage tank 39. When the desired charge has been put into the tanks 63, the valves 65 and 108 are shut off and the flexible hose connection 107 is detached. The flexible hose connection 103 remains connected to the outlet 81, and if the valve 105 has been opened when the unspent charge has been taken from the railway car it is now closed and valve 106 is opened. The pump, if used, is reversed and the pre-cooled charge in the storage tank 32 is inserted into the storage tanks 76 on the railway car. As soon as the required charge has been made, valves 82, 104 and 106 are closed; the flexible hose connection 103 is detached and the railway car is now ready to continue its run with a fresh charge of cooling agents.

Figures 6, 7:
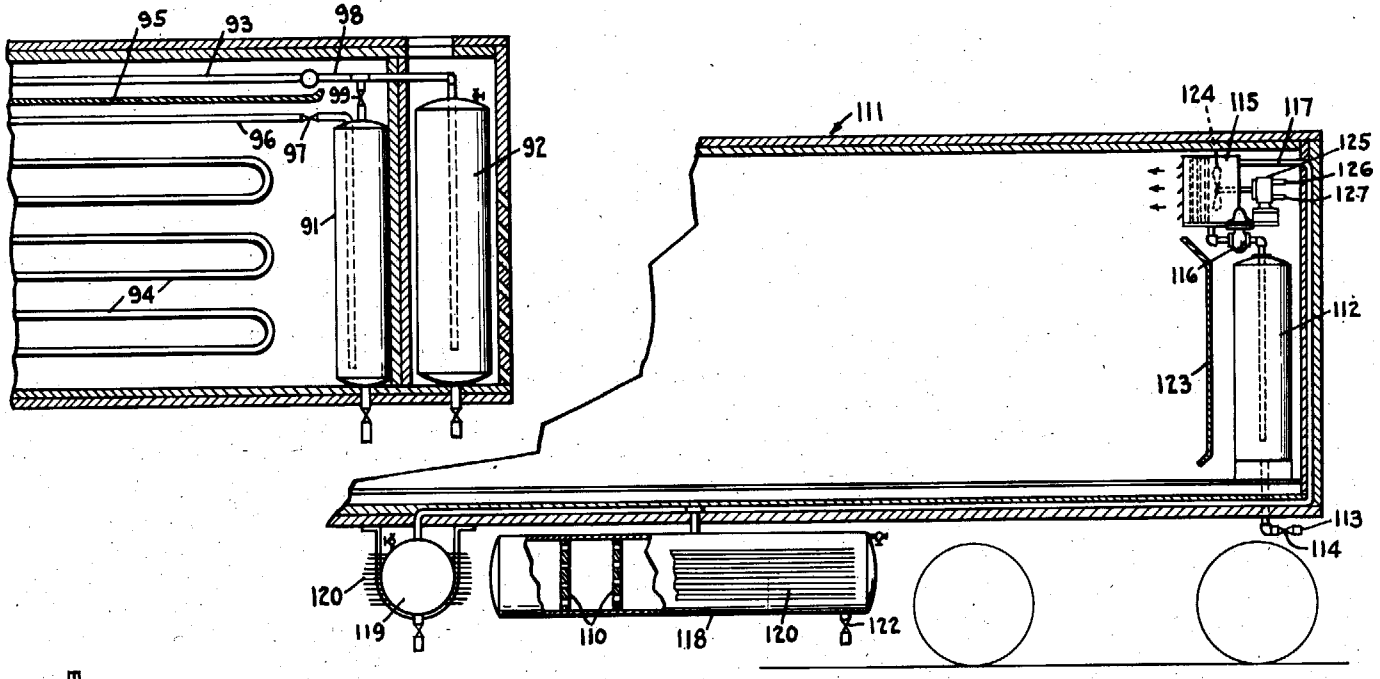
Fig. 6 is a diagrammatic illustration of a portion of a railway car with a modified arrangement of cooling surface.
Fig. 7 is a diagrammatic illustration of a railway car with a modified form of refrigeration mechanism applied thereto and utilizing the principle of circulating cooled air.

A modified arrangement of cooling surfaces is shown in Fig. 6. In this figure, one or more tanks 91 are intended to hold the charge of precooled refrigerant corresponding to the tanks 76 of Fig. 2, and one or more tanks 92 are intended to hold the charge of weak liquor, the same as tanks 63 of Fig. 2. In this figure, the cooling surfaces are provided by a set of roof coils 93 and one or more side wall coils 94. The roof coils are separated in a separate compartment by the partition wall 95. The coils 93 and 94 may be interconnected or may be independently supplied with refrigerant from the tanks 91 but in this figure they are intended to be shown interconnected, and fed from the supply pipe 96 having expansion valve 97 therein. The supply pipe 96 is not shown connected to the coils 93 and 94 because they are broken away. The point of connection is at a distance removed from the absorber tanks 92. The expanded refrigerant passes through the coils 93, 94, is vaporized in absorbing the heat from the interior of the car and passes out of the coils through the return line indicated at 98 and which extends into the absorber tanks 92. If desired, the top of the tanks 91 may be vented to the return line through the valved connection 99 as shown.

Otherwise, the car portion of the entire refrigeration system is charged, emptied, and functions as described above in connection with Figs. 2, 3 and 4.

A further modified system and arrangement of cooling tanks is shown in Fig. 7. In this figure, the railway car is diagrammatically illustrated at 111. Mounted inside of the car and in one end thereof is one or more tanks 112 intended to be filled with pre-cooled liquid ammonia through the connection 113 controlled by the valve 114. The tank 112 is in communicated with the coils of an air cooling unit 115 through the valve 116 and associated piping. This latter unit may be of any well known construction, that shown in the drawing being for purposes of illustration only. The return line for the gases spent in the air cooling unit is indicated at 117, this pipe extending down the end wall of the car and along the bottom into communication with one or more tanks 118 and 119 respectively arranged longitudinally and transversely of the railway car. These tanks are provided with finned cooling surfaces as indicated at 120 and are the weak liquor storage or absorber tanks equivalent to the tanks 63 of Figs. 2 to 4. They are intended to be filled with weak liquor through the valved connections 122. It will be noted that the tanks 118 and 119 are disposed underneath the car body 111. The tanks may or may not be provided with a plurality of internal splash guard plates 110, which are perforated for the passage of the liquid therethrough.

The bunker wall or partition 123 divides the cooling equipment off from the remainder of the car interior. However, the bunker wall 123 does not extend entirely to the bottom or to the top of the car, allowing for the circulation of air thereabout. Mounted within the air cooling unit 115 is a fan 124, the prime mover of which is indicated at 125. The prime mover in this case may be an electric motor or may be, as indicated, an air motor connected to the compressed air lines of the train through the pipes 126 and 127.

When the tanks 118, 119 and 112 are filled as heretofore described at the central depot, and the fan 124 operates it circulates the air through the body of the car, through the compartment in back of the bunker wall 123 and through the air cooling unit 115, where the air is cooled. This circulation of cold air serves to refrigerate the interior of the car 111. The circulation of warm air past the unit 115 vaporizes the refrigerant, the spent gases leaving the radiator of the air cooling unit 115 and becoming absorbed in the liquor in the tanks 118, 119. When the car returns to the central depot the tanks 114, 118 and 119 are emptied and may be refilled as described above.

It will be apparent from the foregoing description that a system of mobile refrigeration has been provided, which involves no moving parts and a minimum of apparatus on the mobile unit together with a new and improved system of handling a plurality of such mobile units. Furthermore, the system of charging and regulating the temperature of the railway car is simple and efficient.

Modifications may be made in the arrangement and location of parts within the spirit and scope of the invention, and such modifications are intended to be covered by the appended claims.

What is claimed is:

1. A refrigerated power-moved unit comprising a body having cooling apparatus therefor comprising only an evaporator of an absorption refrigeration system mounted in the body and arranged to cool the interior thereof, the evaporator comprising two spaced-apart refrigerant holding tanks, a plurality of pipes each interconnecting said tanks and provided with finned cooling surfaces, an absorber carried by said body and connected to the evaporator, and means for air cooling the absorber.

2. A refrigerator power-moved unit comprising a body, a combined refrigerant holder and evaporator of an absorption refrigeration system mounted in the body and having refrigerant storage capacity, an absorber for the spent refrigerant mounted outside said body, a pipe connection from the evaporator to the absorber, and means in said connection responsive to the pressure in said evaporator for automatically limiting the evaporator pressure to maintain substantially uniform temperature in the evaporator.

3. A refrigerated unit comprising a body, a combined refrigerant holder and evaporator of an absorption refrigeration system mounted in the body and having refrigerant storage capacity, an absorber for the spent refrigerant mounted outside said body, a pipe connection from the evaporator to the absorber, and a regulator valve mounted in said pipe connection, said regulator valve being responsive to the pressure in said evaporator for automatically limiting the evaporator pressure to maintain substantially uniform temperature in the evaporator.

4. A refrigerated mobile transportation unit comprising a body having cooling apparatus therefor including an evaporator of an absorption refrigeration system mounted in the body and arranged to cool the interior thereof, the evaporator comprising two spaced-apart refrigerant holders, a plurality of pipes each interconnecting said holders and having extensive cooling surfaces, an absorber carried by said body in such position that air passes thereover upon movement of the unit, connections between said absorber and said holders, and means whereby the refrigerant holders and absorber may be periodically supplied with fresh refrigerant and absorbent respectively.

5. A refrigerated mobile transportation unit comprising a body having cooling apparatus therefor including an evaporator of an absorbent refrigeration system mounted in the body and arranged to cool the interior thereof, the evaporator comprising two parallel spaced-apart refrigerant holders interconnected by a plurality of parallel pipes arranged at right angles to the holder axes in spaced relation axially of said tanks and having extensive cooling surfaces, an absorber carried by said body, and connections between said absorber and said holders.

6. A refrigerated mobile transportation unit comprising a body having cooling apparatus therefor including an evaporator of an absorbent refrigeration system mounted in the body and arranged to cool the interior thereof, the evaporator comprising two vertical spaced-apart refrigerant holders interconnected by a plurality of superposed horizontal pipes provided with extensive cooling surfaces, an absorber carried by said body and connections between said absorber and said holders.

7. A refrigerated mobile unit comprising a body provided with wheels, a combined refrigerant holder and evaporator carried by said unit and including cooling coils disposed within said body, an absorber connected to said coils and mounted exteriorly of said body in such position that air passes freely thereover upon movement of the unit, means responsive to the pressure in said evaporator for automatically limiting the evaporator pressure to maintain substantially uniform temperature in the evaporator, and means whereby the evaporator and absorber may be periodically supplied with fresh refrigerant and absorbent respectively.

8. A refrigerated mobile unit comprising an enclosure, an evaporator carried by said unit within said enclosure, a refrigerant storage tank, means connecting said tank to said evaporator and including means for regulating the flow of refrigerant from said tank to said evaporator, an absorber connected to said evaporator and mounted exteriorly of said enclosure in such position that air passes freely thereover upon movement of the unit, and means whereby said tank and absorber may be periodically supplied with fresh refrigerant and absorbent respectively.

9. In a mobile transportation unit, a body containing an absorptive refrigeration system evaporator comprising two spaced-apart refrigerant holding tanks, a plurality of pipes each interconnecting said holder tanks and provided with finned cooling surfaces, an absorber connected to said evaporator, and means for directing cooling fluid into contact with said absorber.

10. In a mobile transportation unit, a body containing a combined storage tank and evaporator of an absorptive refrigeration system having refrigerant storage capacity, an absorber for spent refrigerant, a pipe interconnecting said evaporator and absorber, and means responsive to the pressure in said evaporator for automatically limiting the evaporator pressure to maintain substantially uniform temperature in the evaporator.

11. In a mobile transportation unit, a body containing a refrigerant holding tank, an evaporator coil connected to said tank, an absorber for spent refrigerant outside said body, a pipe connecting said evaporator coil and absorber, and a regulator valve mounted in said pipe, said valve being responsive to the pressure in said evaporator coil for automatically limiting the evaporator coil pressure to maintain substantially uniform temperature in the evaporator coil.

STANDARD CAP & SEAL CORPORATION,
*Assignee of Oliver C. Irwin, Deceased.*
By RUSSEL McGEE,
*President.*